United States Patent
Onaka

(10) Patent No.: US 10,306,154 B2
(45) Date of Patent: May 28, 2019

(54) IMAGE DISPLAY DEVICE

(71) Applicant: HONDA MOTOR CO., LTD., Tokyo (JP)

(72) Inventor: Junichiro Onaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 86 days.

(21) Appl. No.: 15/494,960

(22) Filed: Apr. 24, 2017

(65) Prior Publication Data

US 2017/0310906 A1    Oct. 26, 2017

(30) Foreign Application Priority Data

Apr. 25, 2016  (JP) ................................ 2016-086681

(51) Int. Cl.
| | |
|---|---|
| *H04N 5/262* | (2006.01) |
| *G06T 7/70* | (2017.01) |
| *B60R 1/00* | (2006.01) |
| *B60R 1/04* | (2006.01) |
| *G06T 7/20* | (2017.01) |

(Continued)

(52) U.S. Cl.
CPC ............. *H04N 5/2628* (2013.01); *B60R 1/00* (2013.01); *B60R 1/04* (2013.01); *B60R 1/12* (2013.01); *G06T 7/20* (2013.01); *G06T 7/70* (2017.01); *H04N 5/23293* (2013.01); *H04N 5/247* (2013.01); *B60R 2001/1253* (2013.01); *B60R 2300/207* (2013.01); *B60R 2300/605* (2013.01); *B60R 2300/8066* (2013.01); *G06T 2207/30196* (2013.01); *G06T 2207/30268* (2013.01); *H04N 5/2257* (2013.01)

(58) Field of Classification Search
CPC .. H04N 5/2628; H04N 5/23293; H04N 5/247; H04N 5/2257; G06T 7/70; G06T 7/20; G06T 2207/30196; G06T 2207/30268; B60R 1/00; B60R 1/04; B60R 1/12; B60R 2001/1253; B60R 2300/207; B60R 2300/605; B60R 2300/8066
See application file for complete search history.

(56) References Cited

FOREIGN PATENT DOCUMENTS

| | | |
|---|---|---|
| JP | 2008-18760 A | 1/2008 |
| JP | 2010-179850 A | 8/2010 |

(Continued)

OTHER PUBLICATIONS

Office Action dated Feb. 20, 2018, issued in counterpart Japanese Application No. 2016-086681, with English machine translation. (6 pages).

*Primary Examiner* — Maria E Vazquez Colon
(74) *Attorney, Agent, or Firm* — Westerman, Hattori, Daniels & Adrian, LLP

(57) ABSTRACT

An image display device 12 includes a camera 20 for imaging a rear of a vehicle 10, a reference position detection section 80 for detecting a reference position indicating a relative position of eyes 104 of an operator 100 relative to a display part 50, and an image control section 82 for extracting a part of an imaged image of the camera 20 thereby to display it as a circumferential image on the display part 50 and changing an extraction range of the imaged image in accordance with the reference position. The image control section 82 increases or decreases a movement amount of the extraction range relative to a change amount of the reference position in comparison with the case of a normal mirror 120.

2 Claims, 9 Drawing Sheets

(51) Int. Cl.
*H04N 5/232* (2006.01)
*B60R 1/12* (2006.01)
*H04N 5/247* (2006.01)
*H04N 5/225* (2006.01)

(56) References Cited

FOREIGN PATENT DOCUMENTS

| | | | | |
|---|---|---|---|---|
| JP | 2010179850 | A | * | 8/2010 |
| JP | 2011-188028 | A | | 9/2011 |
| JP | 2011188028 | A | * | 9/2011 |
| JP | 2012-179958 | A | | 9/2012 |
| JP | 2013-216286 | A | | 10/2013 |

* cited by examiner

FIRST COMPARATIVE EXAMPLE
(IN THE CASE OF NORMAL MIRROR)

FIRST MODIFIED EMBODIMENT

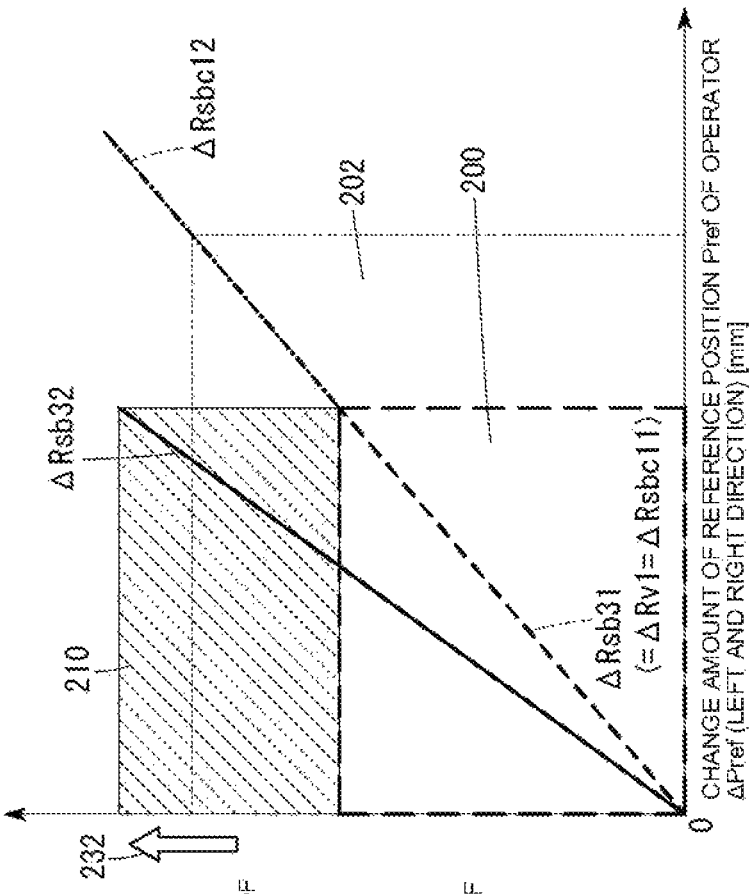

IMAGE DISPLAY DEVICE

CROSS-REFERENCE TO RELATED APPLICATION

This application claims priority of Japanese Patent Application No. 2016-086681 filed in Japan on Apr. 25, 2016, the entire contents of which are incorporated herein by reference.

TECHNICAL FIELD

The present invention relates to an image display device which displays a circumferential image of a vehicle.

BACKGROUND OF THE INVENTION

In Japanese Patent Application Laid-Open Publication No. 2008-018760, an object of the invention is to provide a driving support device in which a visually confirmable area can be changed through a display device (rear side monitor) in accordance with tastes of an operator ([0004], Abstract). To accomplish the object, in Japanese Patent Application Laid-Open Publication No. 2008-018760 (Abstract), the driving support device 10 has an external field camera 13 which is provided in a vehicle and capable of imaging a predetermined area outside the vehicle, and a monitor 15 which displays an image imaged by the external field camera 13 in a visually confirmable manner by the operator of the vehicle. Moreover, the driving support device 10 has an area setting means which sets a narrower area than the predetermined area in the image imaged by the external field camera 13. The monitor 15 is able to visually confirm only the set area S' set by the area setting means.

In Japanese Patent Application Laid-Open Publication No. 2008-018760, a position of the set area S' is automatically changed based on a position (eye point) of an eyeball of the operator ([0038] to [0041]).

In Japanese Patent Application Laid-Open Publication No. 2013-216286, an object of the invention is to provide a vehicle circumference confirming monitor device close to feeling of use of a rearview mirror ([0007], Abstract). To accomplish the object, in Japanese Patent Application Laid-Open Publication No. 2013-216286 (Abstract), there are provided an image processing means 14 for processing an input image Vo imaged by a back camera 11 for imaging the rear of the vehicle, an image display means 12 for displaying a processed output image Va, Vb, and a posture detection means 13 for detecting a relative position of a head of an operator D (Da, Db). The image processing means 14 can execute such processing as to cut out a part from a whole image range of the input image Vo, based on the relative position of operator's head detected by the posture detection means 13, thereby to form the output image Va, Vb. In addition, in accordance with a change amount of the relative position of the operator's head detected by the posture detection means 13, the image processing means 14 can execute such processing as to have the cutting out range (Va, Vb) of the input image Vo moved in the direction opposite to the change direction.

As mentioned above, in Japanese Patent Application Laid-Open Publication No. 2008-018760, the set area S' (display area of the monitor 15) is set automatically based on the eye point of the operator ([0038] to [0041]). Similarly, in Japanese Patent Application Laid-Open Publication No. 2013-216286, the range of the output image Va, Vb of the image processing means 12 is set based on the relative position of the operator's head (Abstract).

For example, when the imaging range of the camera is wider than a range of a visual field confirmed by a normal mirror having a mirror surface, the operator is required to change a lot a reference position such as the eye point, the operator's head and the like in order for the operator to confirm the whole imaged range of the camera. In other words, in order to display the image in the vicinity of a boundary of the imaged range of the camera, the operator is required to change on a large scale its own reference position in comparison with the case of using the normal mirror. This means that the operator may take unnatural posture in order to display the image in the vicinity of the boundary of the imaged range of the camera, so that there is a possibility of decrease in convenience.

SUMMARY OF INVENTION

The present invention has been made in consideration of the above described problems and has an objective of providing an image display device capable of improving the operator's convenience in relation to the use of a circumferential image of a vehicle.

An image display device according to the present invention comprises a camera for imaging the rear of a vehicle, a reference position detection section for detecting a reference position indicating a relative position of eyes of an operator relative to a display part, and an image control section for extracting apart of an imaged image of the camera thereby to display it as a circumferential image on the display part and for changing an extraction range of the imaged image in accordance with the reference position, characterized in that the image control section increases or decreases a movement amount of the extraction range relative to a change amount of the reference position in comparison with a movement amount of a visual field range relative to the change amount of the reference position in the case of replacing the display part with a normal mirror.

According to an embodiment of the present invention, the movement amount of the extraction range of the imaged image relative to the change amount of the reference position of the operator is increased or decreased in comparison with the movement amount of the visual field range relative to the change amount of the reference position of the operator in the case of replacing the display part with the normal mirror. With this configuration, even in the case where the imaged range of the camera is wider or narrower than the rear range of the vehicle which is confirmed through the normal mirror by the operator, the circumferential image can be displayed in accordance with the imaged range of the camera. Therefore, the convenience of the operator in relation to the use of the circumferential image of the vehicle can be improved.

When the reference position of the operator does not exceed the position threshold value, the image control section allows the movement amount of the extraction range relative to the change amount of the reference position to be equalized with the movement amount of the visual field range relative to the change amount of the reference position of the normal mirror. Moreover, when the reference position exceeds the position threshold value, the image control section allows the movement amount of the extraction range relative to the change amount of the reference position to be made larger than the movement amount of the visual field range relative to the change amount of the reference position of the normal mirror.

With this configuration, when the reference position the operator does not exceed, a position threshold value, it is possible to realize the feeling of use which is equal to the normal mirror. Further, when the reference position of the operator exceeds the position threshold value, since it is possible to see the whole of the circumferential image in a small amount of change, the convenience of the operator in relation to the use of the circumferential image of the vehicle can be improved.

The image control section allows the movement amount of the extraction range relative to the change amount of the reference position to be changed in accordance with a distance between the display part and the reference position. With this configuration, the movement amount of the extraction range relative to the change amount of the reference position can be increased or decreased when the operator has changed the reference distance in order to see the image in the vicinity of the boundary of the imaged, range of the camera. Therefore, the convenience of the operator in relation to the use of the circumferential image of the vehicle can be, further improved. The word "section" used in this application may mean a physical part or component of computer hardware or any device including a controller, a processor, a memory, etc., which is particularly configured to perform functions and steps disclosed in the application.

Effect of Invention

According to the present invention, it is possible to improve the convenience of the operator in relation to the use of the circumferential image of the vehicle.

BRIEF DESCRIPTION OF THE DRAWINGS

FIG. 9 is a diagram showing a relationship between the change amount of the reference position of the operator and the movement amount of the extraction range in accordance with a second modified embodiment.

DETAILED DESCRIPTION OF THE INVENTION

A. One Embodiment

Figure 1:
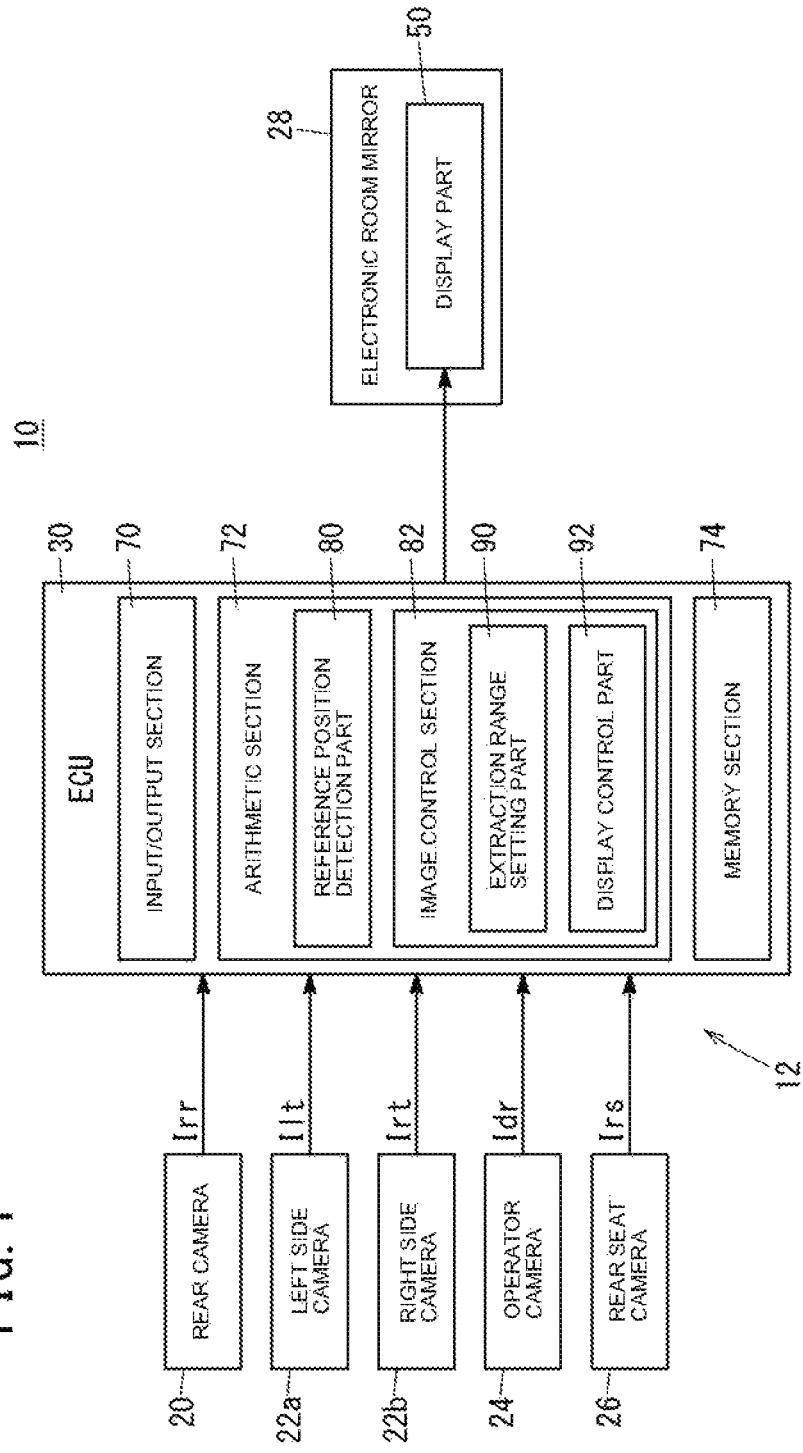
FIG. 1 is a schematic configuration diagram showing vehicle equipped with an image display device in accordance with an embodiment of the present invention.

<A-1: Configuration>
[A-1-1: Overall Configuration]
FIG. 1 is a schematic configuration diagram showing a vehicle 10 equipped with an image display device 12 in accordance with an embodiment of the present invention. As shown in FIG. 1, the image display device 12 has a rear camera 20, side cameras 22a, 22b, an operator camera 24, a rear seat camera 26, an electronic room mirror 28, and an electronic control unit 30 (hereinafter, referred to as "ECU 30"). The vehicle 10 of the present embodiment is a right-hand drive car. Alternatively, a similar configuration may be adopted also in the case of a left-hand drive car. Hereinafter, the rear camera 20, the side cameras 22a, 22b, the operator camera 24 and the rear seat camera 26 are also referred to as the camera 20, and the cameras 22a, 22b, 24 and 26.

[A-1-2: Rear Camera 20]
The rear camera 20 is a color camera for imaging an image (hereinafter, referred to as "rear image Irr") in the rear of the vehicle 10. A rear image Irr is displayed on the electronic room mirror 28 at the time the vehicle 10 makes a backward movement, so as to assist operation of the operator 100 (FIG. 6), and is for allowing the operator 100 to confirm the rear of the vehicle 10 at the time of normal traveling of the vehicle 10.

The rear camera 20 is arranged in the rear of the vehicle 10 while facing rearward from the vehicle 10. To be more concrete, the rear camera 20 is arranged on a rear bumper, for example. Or alternatively, the rear camera 20 may be arranged in the vicinity (for example, a roof) of a rear window within a compartment. Data of the rear image Irr imaged by the rear camera 20 is outputted to the ECU 30.

[A-1-3: Side Cameras 22a, 22b]
The side cameras 22a, 22b are color cameras for imaging an image (hereinafter, referred to as "side image Isd") of each lateral side of the vehicle 10. The side camera 22a (hereinafter, also referred to as "left side camera 22a") images an image (hereinafter, referred to as "left side image Ilt") of a left side of the vehicle 10. The side camera 22b (hereinafter, also referred to as "right side camera 22b") images an image (hereinafter, referred to as "right side image Irt") of a right side of the vehicle 10. The side image Isd is for allowing the operator 100 to confirm the lateral sides (including the lateral sides in the rear) of the vehicle 10 during the normal traveling or the backward movement of the vehicle 10.

The side cameras 22a, 22b are arranged so as to face toward a rear lateral side of the vehicle 10 on the lateral sides (for example, side mirrors) of the vehicle 10. Data of the side images Isd imaged by the side cameras 22a, 22b is outputted to the ECU 30.

Figure 6:
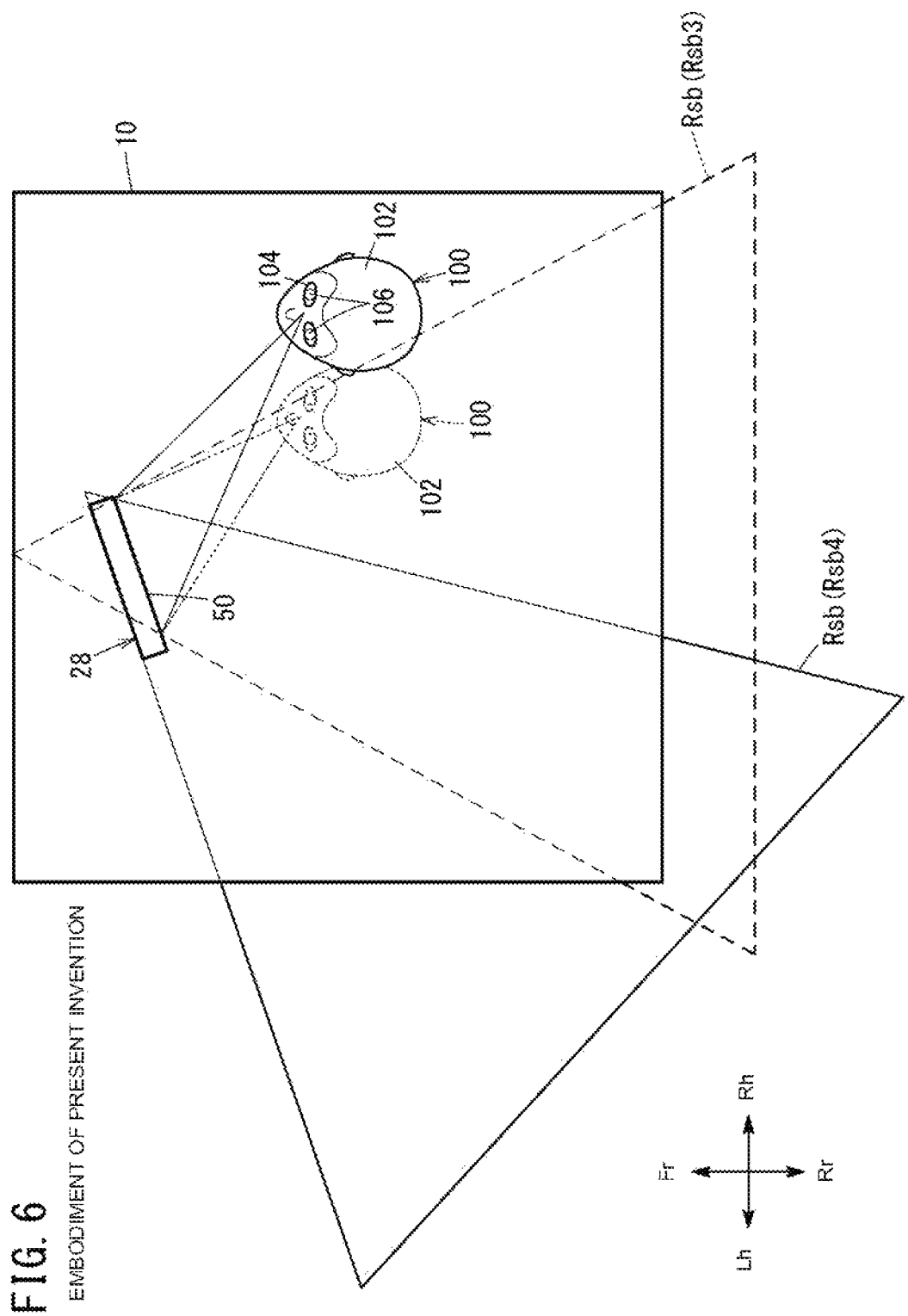
FIG. 6 is an explanatory diagram for explaining the setting method of the extraction range in the above embodiment.

[A-1-4: Operator Camera 24]
The operator camera 24 is a color camera for imaging an image (hereinafter, referred to as "operator image Idr") of substantially a front of the operator 100 (FIG. 6). The operator image Idr is for confirming the reference position Pref of the operator 100 (the details will be referred to later). The operator camera 24 is arranged so as to face toward the operator's seat (not shown) in front of the operator's seat (for example, in the vicinity of the electronic room mirror).

Data of the operator image Idr imaged by the operator camera 24 is outputted to the ECU 30.

[A-1-5: Rear Seat Camera 26]

The rear seat camera 26 is a color camera for imaging an image (hereinafter, referred to as "rear seat image Irs") of substantially a front of the rear seat (not shown). The rear seat image Irs is for showing a passenger seated on the rear seat. The rear seat camera 26 is arranged so as to face toward the rear seat in front of and on the upper side of the rear seat. Data of the rear seat image Irs imaged by the rear seat camera 26 is outputted to the ECU 30.

[A-1-6: Electronic Room Mirror 28]

The electronic room mirror 28 (hereinafter, also referred to as "electronic mirror 28" or "mirror 28") is arranged on this side (the rearward side in the traveling direction of the vehicle 10) of an upper part of a front window (not shown) when viewed from the operator 100 (occupant), within the compartment. The mirror 28 has a display part 50 (FIG. 1) which displays a circumferential image Isr of the vehicle 10. The circumferential image Isr in this case is created from, for example, only the rear image Irr or a combination of the rear image Irr and the side image Isd. Therefore, the operator 100 can confirm the states on the rear side and/or the lateral sides of the vehicle 10 through the display part 50 of the mirror 28.

In the present embodiment, the display part 50 is formed of a display panel such as a liquid crystal panel, organic electroluminescence (EL), etc., for example. Or alternatively, the display part 50 may be formed as a projection part on which a projecting image of a projector which is not shown in the drawing is projected.

As described above, the rear camera 20 and the side cameras 22a, 22b face outward from the vehicle 10. Therefore, the rear image Irr and the side image Isd do not contain an image of an interior of the vehicle 10. Accordingly, in the normal state of use, the interior of the vehicle 10 is not displayed on the display part 50 of the mirror 28. The image (the circumferential image Isr) displayed on the display part 50 is different from an image which is displayed on a normal room mirror 120 (FIG. 3) (a mirror whose mirror surface is specularly finished).

Further, when a mirror position adjustment mechanism (hereinafter, also referred to as "adjustment mechanism") which is not shown in the drawing is provided, a position P (hereinafter, referred to as "mirror position Pmr" or "display part position Pdp") of the mirror 28 may be adjusted by the operation of the operator 100. The adjustment mechanism has, for example, an inclination angle adjustment mechanism and a rotation angle adjustment mechanism. The inclination angle adjustment mechanism is a mechanism for adjusting an inclination angle of the mirror 28 in the left and right direction (the width direction), in the upward and downward direction or in the forward and backward direction of the vehicle 10. The rotation angle adjustment mechanism is a mechanism for adjusting a rotation angle of the mirror 28. The inclination angle adjustment mechanism and the rotation angle adjustment mechanism are comprised of a ball joint, for example. Or alternatively, each of the adjustment mechanisms may be configured so as to have a mechanism (for example, slider mechanism) which changes three-dimensionally or linearly the mirror position Pmr.

[A-1-7: ECU 30]

(A-1-7-1: Outline of ECU 30)

The ECU 30 is configured to control the image displayed on the display part 50 of the mirror 28, and has an input and output section 70, an arithmetic section 72 and a memory section 74. The input and output section 70 performs an input and output of a signal. An analog-to-digital converter and a digital-to-analog converter may be included in the input and output section 70. The arithmetic section 72 executes various kinds of control by using a program and data stored in the memory section 74. The arithmetic section 72 includes a central arithmetic and logic unit (CPU). Details of the arithmetic section 72 will be referred to later.

The memory section 74 is configured to memorize the program and data which are used in the arithmetic section 72, and provided with a random access memory (hereinafter, referred to as "RAM"). As the RAM, a volatile memory such as a register, etc. and a non-volatile memory such as a flash memory, etc. can be used. Further, the memory section 74 may have a read only memory (hereinafter, referred to as "ROM") in addition to the RAM.

(A-1-7-2: Arithmetic Section 72)

As shown in FIG. 1, the arithmetic section 72 has a reference position detection part 80 and an image control section 82.

The reference position detection part 80 detects a reference position Pref of the operator 100 based on the operator image Idr. The reference position Pref is configured to indicate a relative position of eyes 104 (FIG. 6) of the operator 100 relative to the display part 50. In the present embodiment, the reference position Pref is a specific position of a head 102 (FIG. 6) of the operator 100. Or alternatively, the position of the eyes 104 (eyeballs) of the operator 100, the position of a nose thereof, the position of a shoulder thereof, etc. may be used as the reference position Pref. The reference position Pref is used for settings of an extraction range Rsb to be referred to later.

The image control section 82 is configured to control the circumferential image Isr which is displayed on the display part 50 by using the images (hereinafter, also referred to as "imaged image Icp") imaged by the cameras 20, 22a, 22b, 24, 26. In the following description, the imaged images Icp of the rear camera 20, the side cameras 22a, 22b, the operator camera 24 and the rear seat camera 26 are also referred to as the imaged image Irr, Ilt, Irt, Idr, Irs, respectively.

As shown in FIG. 1, the image control section 82 has an extraction range setting part 90 and a display control part 92. The extraction range setting part 90 executes extraction range setting control for setting the extraction ranges Rsb of the imaged images Icp of the cameras 20, 22a, 22b, 24, 26. The details of the extraction range setting control will be referred to later with reference to FIG. 2, etc. The display control part 92 extracts a part of the imaged image Icp by using the extraction range Rsb which is set by the extraction range setting control, and displays it on the display part 50 as the circumferential image Isr.

<A-2: Control>

[A-2-1: Mirror Display Control]

Figure 2:
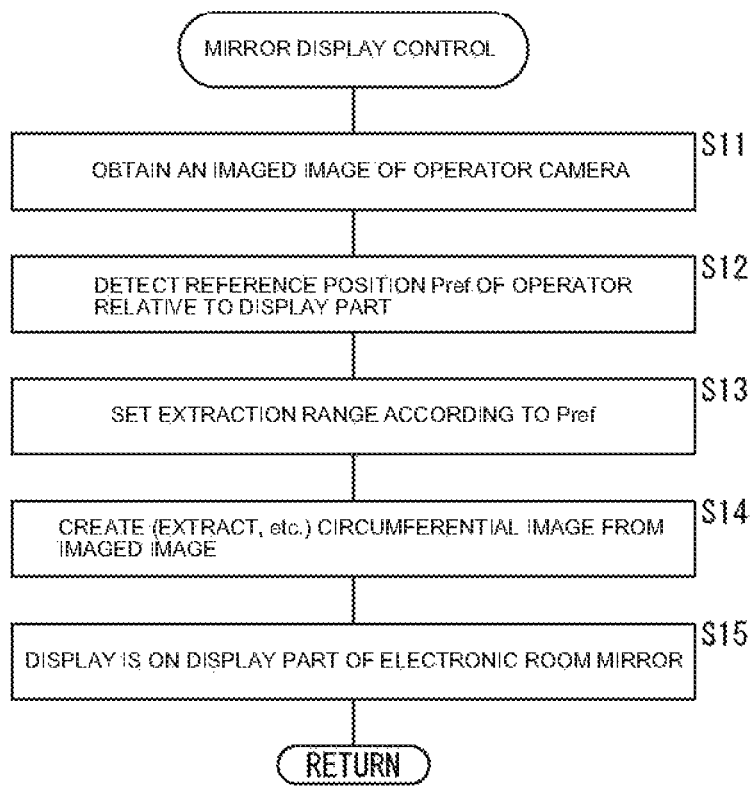
FIG. 2 is a flow chart of mirror display control in accordance with the above embodiment.

FIG. 2 is a flow chart of the mirror display control in the present embodiment. The mirror display control is the control in relation to the display of the room mirror 28 and is executed by the ECU 30. In step S11 of FIG. 2, the ECU 30 obtains the imaged image Icp of the operator camera 24.

In step S12, The reference position detection part 80 of the ECU 30 detects the reference position Pref of the operator 100 based on the operator image Idr. As described above, the reference position Pref indicates the relative position of the eyes 104 (eyeball) of the operator 100 relative to the display part 50. The reference position Pref in the present embodiment is the specific position of the head 102 of the operator 100, for example. Or alternatively, it is possible to use the specific position of the eyes 104, nose, shoulder, etc. of the operator 100 as the reference position Pref. Herein, "the eye 104" here means a position (eye point) of the eyeball itself, and is different from a position of the pupil 106. Therefore, note that the reference position Pref is different from the position of the pupil 106.

In step S13, the extraction range setting part 90 of the ECU 30 sets the extraction range Rsb in accordance with the reference position Pref. A setting method of the extraction range Rsb will be referred to later with reference to FIGS. 3 to 7.

In step S14, the display control part 92 of the ECU 30 creates the circumferential image Isr from the imaged image Icp. At that time, the ECU 30 extracts a part of the imaged image Icp by using the extraction range Rsb set in step S13. For example, when the circumferential image Isr is extracted from only the rear image Irr, the circumferential image Isr is extracted from the imaged image Icp of the rear camera 20. Moreover, when the circumferential image Isr is extracted from both of the rear image Irr and the side image Isd (a left circumferential image Isr or a right circumferential image Isr), the ECU 30 extracts the circumferential image Isr from the imaged image Irr of the rear camera 20 and the imaged image Ilt of the side camera 22a or the imaged image Irt of the side camera 22b.

In step S15, the display control part 92 of the ECU 30 displays the extracted circumferential image Isr on the display part 50 of the electronic room mirror 28.

[A-2-2: Setting of Extraction Range Rsb]
(A-2-2-1: Outline of Visual Field Range Rv of a First Comparative Example)

Figure 3:
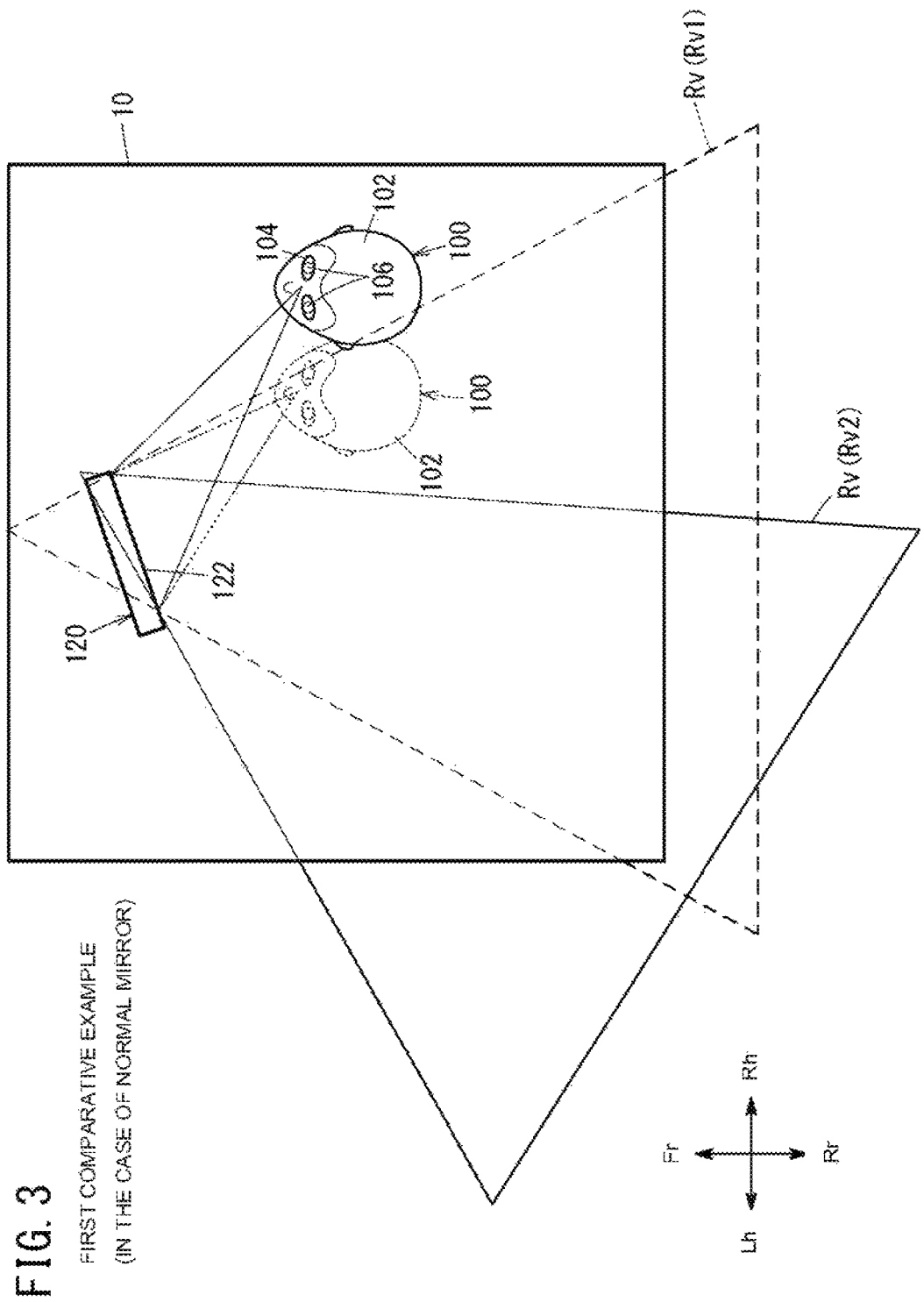
FIG. 3 is an explanatory diagram for explaining a setting method of an extraction range in a first comparative example.
Figure 4:
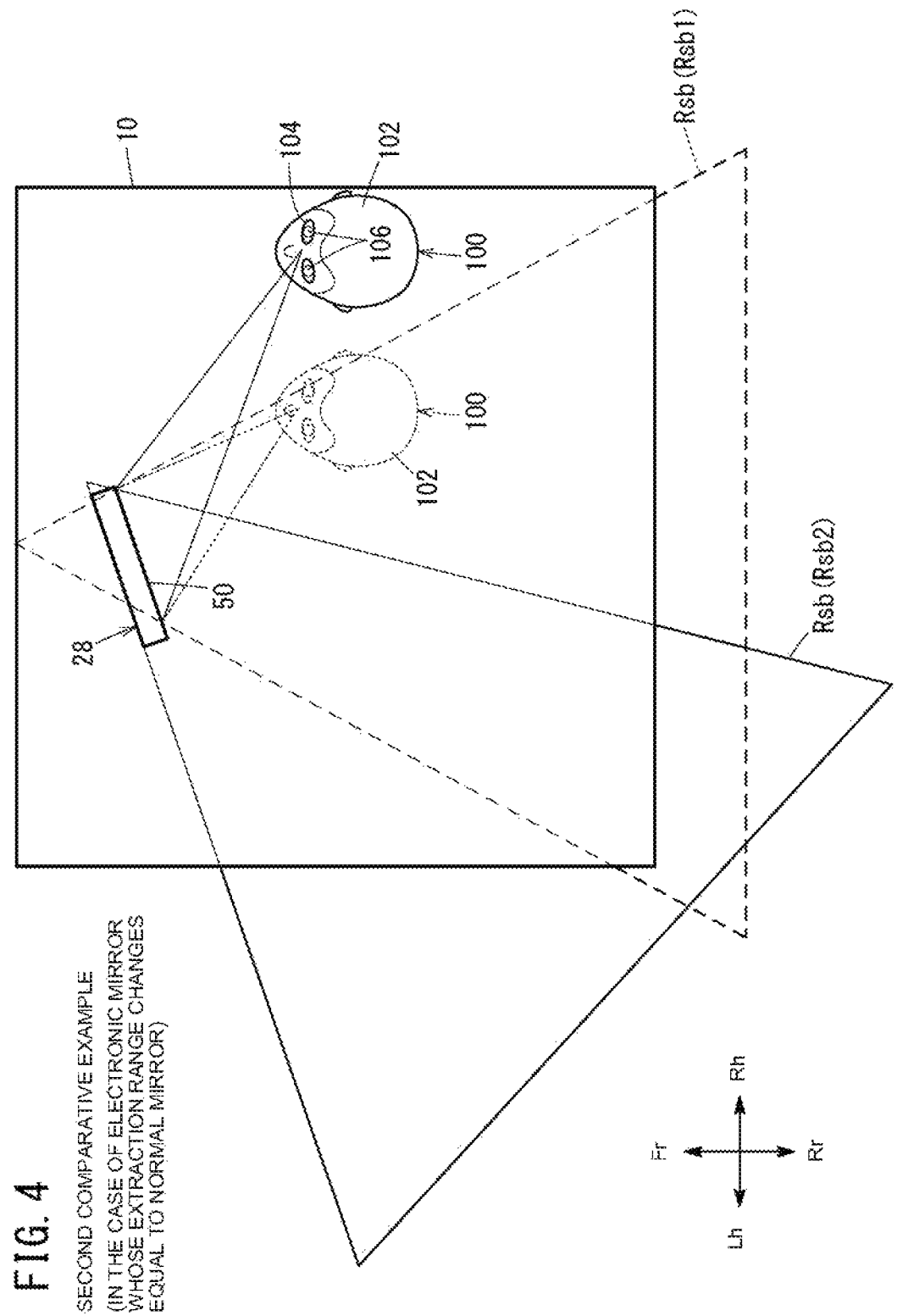
FIG. 4 is an explanatory diagram for explaining a setting method of an extraction range in a second comparative example.

FIG. 3 is an explanatory view for explaining the setting method of the visual field range Rv in the first comparative example. In the first comparative example, a normal or conventional room mirror 120 (hereinafter, also referred to as "normal mirror 120") is used in lieu of the electronic room mirror 28. The normal mirror 120 has a surface 122 (hereinafter, referred to as "mirror surface 122") which is specularly finished. The mirror surface 122 is a plane surface but may be a curved surface. In FIG. 3 and FIGS. 4 and 6 which are referred to later, there are shown the head 102, the eye 104 and the pupil 106 of the operator 100. Parts other than the head 102 of the operator 100 are not shown in the drawings.

In FIG. 3, there is shown the change of the visual field range Rv of the normal room mirror 120 in the case where the reference position Pref of the operator 100 has moved in the left and right direction (the vehicle width direction). FIG. 3 is a plan view when viewed downward from above the vehicle 10. In FIG. 3, a part illustrated by a dashed line indicates the head 102 of the operator 100 and the visual filed range Rv before movement, and a part illustrated by a solid line indicates the head 102 of the operator 100 and the visual field range Rv after movement.

Hereinafter, the visual field range Rv before movement in FIG. 3 is also referred to as the visual field range Rv1, and the visual field range Rv after movement in FIG. 3 is also referred to as the visual field range Rv2.

In the case of FIG. 3, when the head 102 of the operator 100 has moved rightward, the reference position Pref also moves rightward. Then, the image imaged on the normal mirror 120 and the visual field range Rv are changed. To be concrete, when the head 102 moves rightward, the visual field range Rv moves from the rear to the left lateral side of the vehicle 10. Therefore, in FIG. 3, the visual field range Rv moves in the clockwise direction. In other words, the visual field range Rv2 after movement is located in a position moved in the clockwise direction relative to the visual field range Rv before movement.

Further, when the head 102 of the operator 100 has moved rightward, the reference position Pref is spaced apart from (or moves away from) the normal mirror 120. Therefore, the image imaged on the normal mirror 120 becomes smaller and the visual field range Rv is expanded by the ECU 30. However, in FIG. 3, in order to make the movement (rotation) of the visual field range Rv easy to understand, a size of the visual field range Rv is not changed.

(A-2-2-2: Outline of Extraction Range Rsb of a Second Comparative Example)

FIG. 4 is an explanatory diagram for explaining a setting method of the extraction range Rsb in the second comparative example. In the second comparative example, the electronic room mirror 28 is provided in a similar manner as the present embodiment, but the display control of the display part 50 of the mirror 28 is different, as referred to below.

In FIG. 4, there is shown the change of the extraction range Rsb in the case where the reference position Pref of the operator 100 has moved in the left and right direction (vehicle width direction). FIG. 4 is a plan view when viewed downward from above the vehicle 10. In FIG. 4, a part illustrated by a dashed line indicates the head 102 of the operator 100 and the extraction range Rsb before movement, and a part illustrated by a solid line indicates the head 102 of the operator 100 and the extraction range Rsb after movement.

Hereinafter, the extraction range Rsb before movement in FIG. 4 is also referred to as the extraction range Rsb1, and the extraction range Rsb after movement in FIG. 4 is also referred to as the extraction range Rsb2.

As described above, since the rear image Irr and the side image Isd do not contain the image of the interior of the vehicle 10, the image (the circumferential image Isr) displayed on the display part 50 is different from the image displayed on the normal mirror 120 (FIG. 3). In other words, in FIG. 4, although the extraction ranges Rsb1, Rsb2 extend to the interior of the vehicle 10 respectively, the actual circumferential image Isr does not contain the image of the interior of the vehicle 10.

In the case of FIG. 4, when the head 102 of the operator 100 moves rightward, the reference position Pref also moves rightward. At that time, the ECU 30 allows the circumferential image Isr to be changed in accordance with the movement of the reference position Pref so as to become similar to the normal mirror 120. To be concrete, when the head 102 moves rightward, the ECU 30 controls the extraction range Rsb such that the range of the rear image Irr is decreased and the range of the left side image Isd is increased. Therefore, the ECU 30 moves the extraction range Rsb clockwise in FIG. 4. In other words, the extraction range Rsb2 after movement is located in the position moved clockwise relative to the extraction range Rsb1 before movement.

As compared with FIG. 3, an amount of the rightward movement of the head 102 is larger in FIG. 4. Therefore, note that an amount of movement (an amount of rotation) of the extraction range Rsb2 relative to the extraction range Rsb1 in FIG. 4 is larger than an amount of movement (an amount of rotation) of the visual field range Rv2 relative to the visual field range Rv1 in FIG. 3.

Further, when the head 102 of the operator 100 has moved rightward, the reference position Pref is spaced apart from (or moves away from) the mirror 120. Therefore, the ECU 30 arithmetically operates so as to decrease a magnification of the circumferential image Isr. In the wake of this, the extraction range Rsb is expanded. However, in FIG. 4, in order to make the movement (the rotation) of the extraction range Rsb easy to understand, a size of the extraction range Rsb is not changed.

(A-2-2-3: Change of the Visual Field Range Rv in the First Comparative Example, and Details of the Extraction Range Rsb in the Second Comparative Example)

Figure 5:
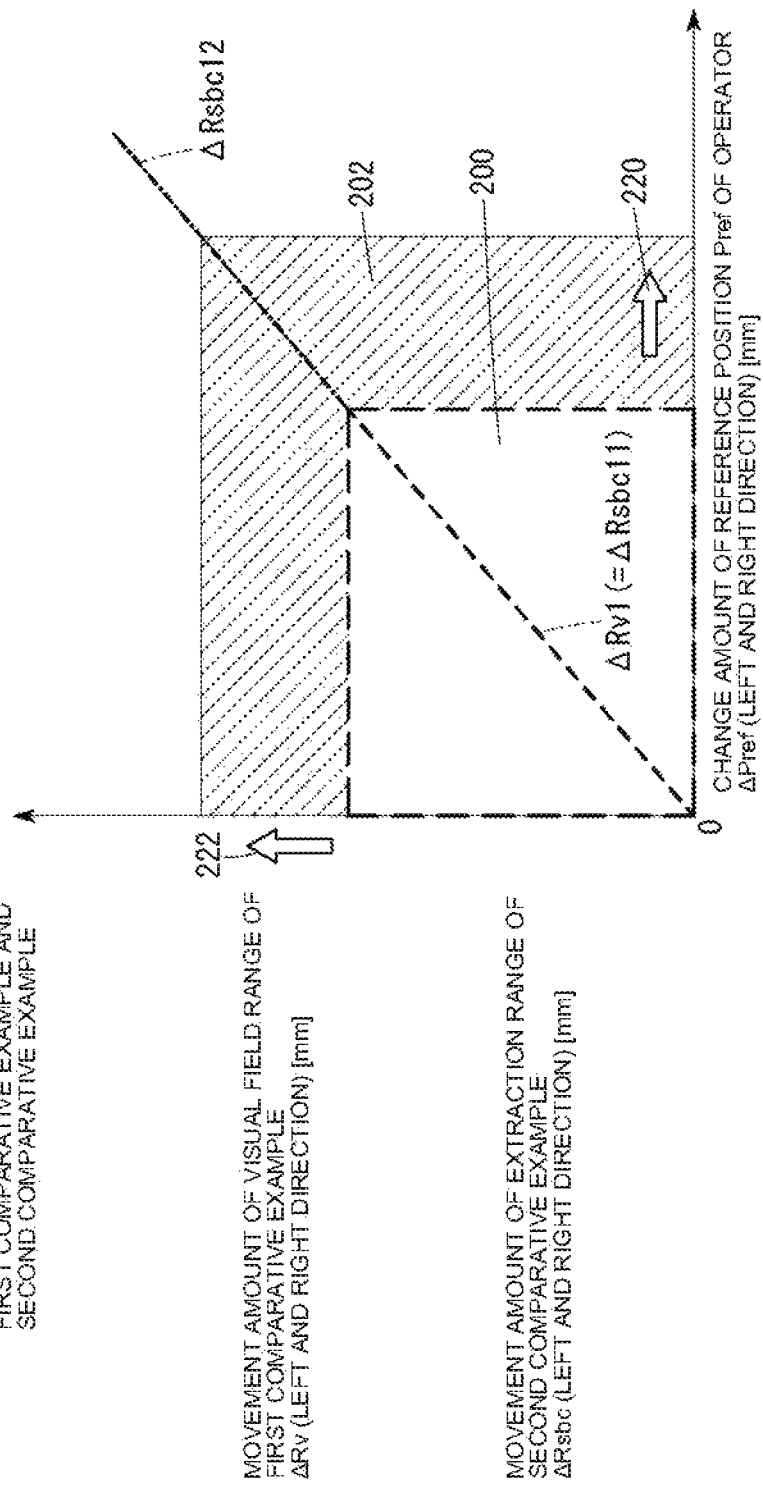
FIG. 5 is a diagram showing a relationship between a change amount of a reference position of an operator and a movement amount of a visual field range in the first comparative example, and a relationship between the change amount of the reference position of the operator and a movement amount of the extraction range in the second comparative example.

FIG. 5 is a diagram showing a relationship between a change amount ΔPref of the reference position Pref of the operator 100 and a movement amount ΔRv of the visual field range Rv in the first comparative example, and a relationship between the change amount ΔPref of the reference position Pref of the operator 100 and a movement amount ΔRsbc of the extraction range Rsb in the second comparative example. In FIG. 5, the movement amount ΔRv of the first comparative example is designated as ΔRv1, and the movement amount ΔRsbc of the second comparative example is designated as ΔRsbc11, ΔRsbc12. In other words, in the case of FIG. 5, the movement amount ΔRsbc of the second comparative example is a combination of ΔRsbc11 and ΔRsbc12.

As described above, the first comparative example employs the normal mirror 120 having the mirror surface 122, in lieu of the electronic room mirror 28. An area 200 of FIG. 5 corresponds to the normal mirror 120. The second comparative example employs the electronic room mirror 28, but the movement amount ΔRsbc (namely, ΔRsbc11) of the extraction range Rsb in the area 200 is equal to the movement amount ΔRv (namely, ΔRv1) of the normal mirror 120.

However, in the case of the second comparative example, since a field angle of the rear camera 20 is wide, or the side images Ilt, Irt of the side cameras 22a, 22b can be added, the range which is wider than the case of the normal mirror 120 can be obtained as the extraction range Rsb. An area 202 of FIG. 5 indicates an expanded area from the area 200 by employing the electronic room mirror 28 of the second comparative example. In other words, the areas 200, 202 correspond to the second comparative example. Arrows 220, 222 indicate a state in which the area 202 is expanded from the area 200.

Like this, in the second comparative example, the extraction range Rsb which is wider than the first comparative example (the normal mirror 120) can be obtained. Accordingly, as compared with the case of the first comparative example (FIG. 3), in the second comparative example (FIG. 4), the operator 100 is required to increase the movement amount of reference position Pref (the head 102, etc.), when the operator 100 confirms the image in the vicinity of a boundary of the extraction range Rsb. This means that the operator 100 may take unnatural posture in order to display the image in the vicinity of the boundary of the circumferential range Isr, so that there is a possibility of decrease in convenience.

(A-2-2-4: Outline of the Extraction Range Rsb in the Present Embodiment)

FIG. 6 is an explanatory diagram for explaining the setting method of the extraction range Rsb in the present embodiment. In the present embodiment, the electronic room mirror 28 is provided in a similar manner to the second comparative example, but the display control of the display part 50 of the mirror 28 is different, as referred to below.

In FIG. 6, there is shown the change of the extraction range Rsb in the case where the reference position Pref of the operator 100 has moved in the left and right direction (the vehicle width direction). FIG. 6 is a plan view when viewed downward from above the vehicle 10. In FIG. 6, a part illustrated by a dashed line indicates the head 102 of the operator 100 and the extraction range Rsb before movement, and a part illustrated by a solid line indicates the head 102 of the operator 100 and the extraction range Rsb after movement.

Hereinafter, the extraction range Rsb before movement in FIG. 6 is also referred to as the extraction range Rsb3, and the extraction range Rsb after movement in FIG. 6 is also referred to as the extraction range Rsb4.

As described above, since the rear image Irr and the side image Isd do not contain the image of the interior of the vehicle 10, the image (the circumferential image Isr) displayed on the display part 50 is different from the image displayed on the normal mirror 120 (FIG. 3). In other words, in FIG. 6, although the extraction ranges Rsb3, Rsb4 extend to the interior of the vehicle 10 respectively, the actual circumferential image Isr does not contain the image of the interior of the vehicle 10.

In the case of FIG. 6, when the head 102 of the operator 100 moves rightward, the reference position Pref also moves rightward. At that time, the ECU 30 allows the circumferential image Isr to be changed in accordance with the movement of the reference position Pref. To be concrete, when the head 102 moves rightward, the ECU 30 controls the extraction range Rsb such that the range of the rear image Irr is decreased and the range of the left side image Isd is increased. Therefore, the ECU 30 moves the extraction range Rsb clockwise in FIG. 6. In other words, the extraction range Rsb4 after movement is located in the position moved clockwise relative to the extraction range Rsb3 before movement.

As compared with FIG. 3, an amount of the rightward movement of the head 102 in FIG. 6 is equal to FIG. 3 and smaller than FIG. 4. For all that, the movement amount ΔRsb (the rotation amount) of the extraction range Rsb4 relative to the extraction range Rsb3 in FIG. 6 is equal to the movement amount ΔRsbc (the rotation amount) of the extraction range Rsb2 relative to the extraction range Rsb1 in FIG. 4. In other words, the movement amount ΔRsb (the rotation amount) of the extraction range Rsb4 relative to the extraction range Rsb3 in FIG. 6 is larger than the movement amount ΔRv (the rotation amount) of the visual field range Rv2 relative to the visual field range Rv1 in FIG. 3.

This is because, in the present embodiment, the movement amount ΔRsb of the extraction range Rsb relative to the change amount ΔPref of the reference position Pref of the operator 100 is configured to be larger in comparison with the first comparative example and the second comparative example (the details will be referred to later with reference to FIG. 7).

Further, when the head 102 of the operator 100 has moved rightward, the reference position Pref is spaced apart from (or moves away from) the mirror 28. Therefore, the ECU 30 arithmetically operates so as to decrease a magnification of the circumferential image Isr. In the wake of this, the extraction range Rsb is expanded. However, in FIG. 6, in order to make the movement (the rotation) of the extraction range Rsb easy to understand, a size of the extraction range Rsb is not changed.

(A-2-2-5: Details of the Extraction Range Pref in the Present Embodiment)

Figure 7:
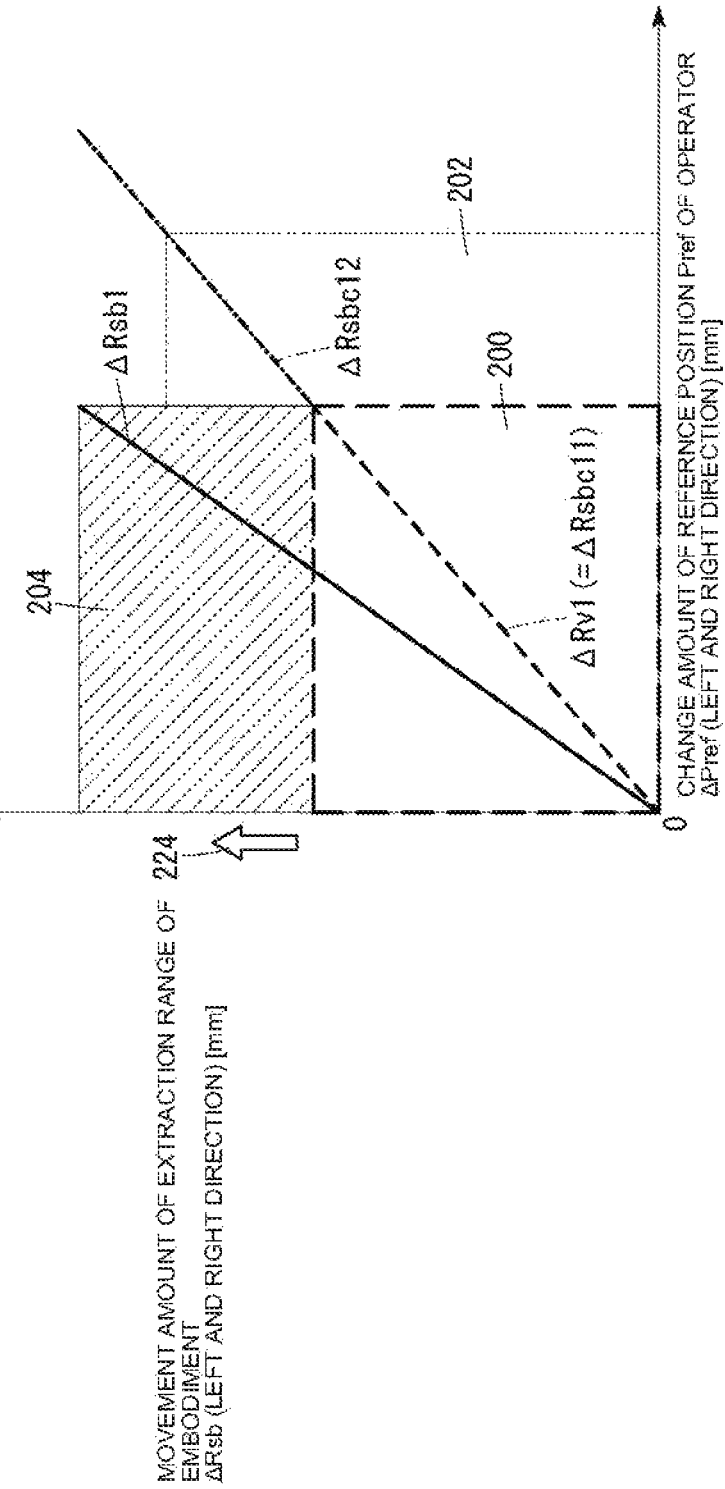
FIG. 7 is a diagram showing a relationship between the change amount of the reference position of the operator and the movement amount of the extraction range in the above embodiment.

FIG. 7 is a diagram showing a relationship between the change amount ΔPref of the reference position Pref of the operator 100 and the movement amount ΔRsb of the extraction range Rsb in the present embodiment. In FIG. 7, the movement amount ΔRsb in the present embodiment is designated as ΔRsb1. Moreover, in FIG. 7, there are indicated the movement amount ΔRv1 of the first comparative example, the movement amounts ΔRsbc11, ΔRsbc12 of the second comparative example and the areas 200, 202 of FIG. 5. Further, an area 204 indicates the area expanded by using the electronic room mirror 28 of the present embodiment. In other words, the areas 200, 204 correspond to the present embodiment. As described above, the area 200 corresponds to the normal mirror 120. An arrow 224 indicates a state in which the area 204 is expanded from the area 200.

As can be seen from the comparison between the FIG. 4 of the second comparative example and FIG. 6 of the present embodiment, the change amount ΔPref of the reference position Pref (the head 102, etc.) of the operator 100 in the present embodiment is small, but the extraction range Rsb therein is equal to the second comparative example. This is because, in the present embodiment, the movement amount ΔRsb of the extraction range Rsb relative to the change amount ΔPref of the reference position Pref is increased. In other words, in FIG. 7, a straight line indicating the movement amount ΔRsb (ΔRsb1) of the extraction range Rsb of the present embodiment is inclined larger than a straight line indicating the movement amount ΔRsbc (ΔRsbc11, ΔRsbc12) of the extraction range Rsb of the second comparative example.

<A-3: Effects of the Present Embodiment>

As described above, according to the present embodiment, the movement amount ΔRsb of the extraction range Rsb of the imaged image Icp relative to the change amount ΔPref of the reference position Pref is increased (FIGS. 6 and 7) in comparison with the movement amount ΔRv of the visual field range Rv relative to the change amount ΔPref of the reference position Pref of the operator 100 in the case of replacing the display part 50 with the normal mirror 120 (the first comparative example of FIGS. 3 and 5). With this configuration, even in the case where the imaged range Rcp of the rear camera 20 (and the side cameras 22a, 22b) is wider than the rear range of the vehicle 10 which is confirmed through the normal mirror 120 by the operator 100, the circumferential image Isr can be displayed in accordance with the imaged range Rcp of the rear camera 20 (and the side cameras 22a, 22b). Therefore, the convenience of the operator 100 in relation to the use of the circumferential image Isr of the vehicle 10 can be improved.

B Modified Embodiment

By the way, the present invention is not limited to the above embodiment, it is a matter of course that various configuration may be adopted based on the description of this specification. For example, the following configurations may be adopted.

<B-1: Loading Subject>

In the above embodiment, the image display device 12 is loaded on the vehicle 10 (FIG. 1). However, for example, from a viewpoint of changing the extraction range Rsb in accordance with the reference position Pref of the operator 100 (the user), it is not limited to that. For example, the image display device 12 may be applied to a moving object such as a vessel and an airplane, etc. Or alternatively, the image display device 12 can be used for a movable device such as a crane.

<B-2: Display Part 50>

In the above embodiment, the display part 50 is arranged in the electronic room mirror 28 (FIG. 1). However, if the display part 50 is configured to display the circumferential image Isr (the extraction image) of the vehicle 10 or other subjects, it is not limited to that. The display part 50 may be arranged in the side mirror (door mirror) of the vehicle 10 or a navigation device which is not shown in the drawing, for example. Or alternatively, the display part 50 may be arranged in the front window and the like as a head up display (HUD).

<B-3: Rear Camera 20 and Side Cameras 22a, 22b>

In the above embodiment, the rear camera 20 and the side cameras 22a, 22b are formed as the color cameras. However, if those are provided for obtaining the imaged image Icp which is used for the circumferential image Isr of the vehicle 10, it is not limited to that. For example, on the assumption of being used during the night, a monochrome camera or a near infrared camera may be used as a part or the whole of the rear camera 20 and the side cameras 22a, 22b.

In the above embodiment, the imaged images Icp of the rear camera 20 and the side cameras 22a, 22b are used as the circumferential image Isr (FIG. 2). However, for example, from a viewpoint of increasing or decreasing the movement amount ΔRsb of the extraction range Rsb relative to the change amount ΔPref of the reference position Pref in comparison with the case of the normal mirror 120 (the first comparative example of FIGS. 3 and 5), it is not limited to that. The imaged image Icp of, for example, either one of the rear camera 20 and each of the side cameras 22a, 22b may be used. Or alternatively, in addition to or instead of those, the imaged image Icp of the rear seat camera 26 may be used.

<B-4: Setting of the Extraction Range Rsb>

In the above embodiment, the movement amount ΔRsb of the extraction range Rsb relative to the change amount ΔPref of the reference position Pref has characteristics indicated in FIG. 7. However, from a viewpoint of increasing or decreasing the movement amount ΔRsb of the extraction range Rsb relative to the change amount ΔPref of the reference position Pref in comparison with the case of the normal mirror 120 (first comparative example of FIGS. 3 and 5), it is not limited to that.

Figure 8:
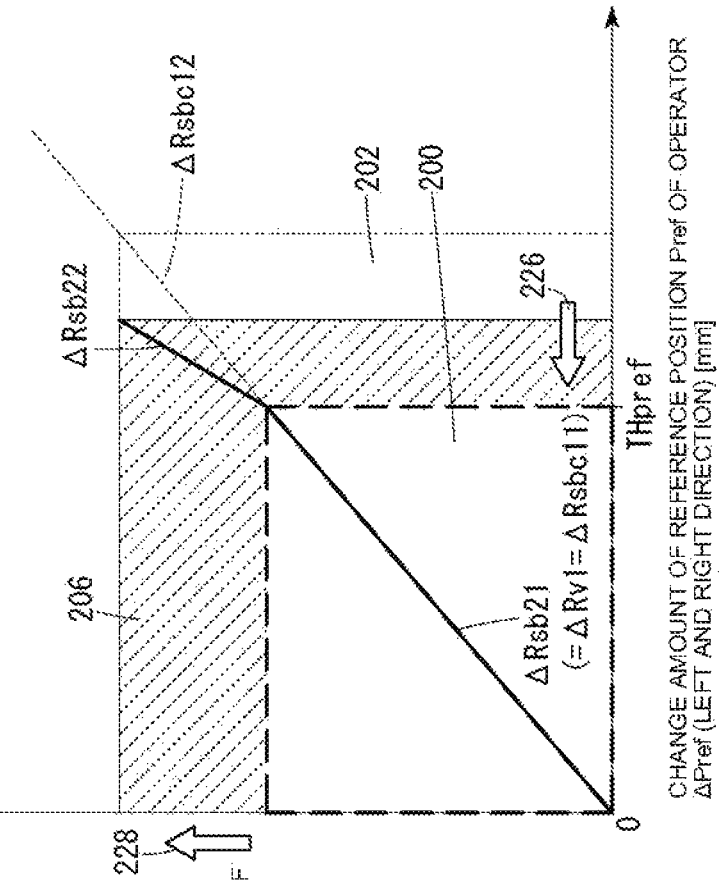
FIG. 8 is a diagram showing a relationship between the change amount of the reference position of the operator and the movement amount of the extraction range in accordance with a first modified embodiment.

FIG. 8 is a diagram showing a relationship between the change amount ΔPref of the reference position Pref of the operator 100 and the movement amount ΔRsb of the extraction range Rsb in accordance with a first modified embodiment. In FIG. 8, the movement amount ΔRsb of the first modified embodiment is designated as ΔRsb21, ΔRsb22. In the above embodiment (FIG. 7), the inclination of the straight line is made larger as compared with the first comparative example and the second comparative example. Meanwhile, the extraction range setting part 90 (the image control section) (FIG. 1) of the first modified embodiment has such a characteristic as indicated in FIG. 8.

To be concrete, the extraction range setting part 90 is configured such that, in the case where the reference position Pref of the operator 100 does not exceed a position threshold value THpref (or the area 200), the change of the movement amount ΔRsb (ΔRsb21) of the extraction range Rsb relative to the change amount ΔPref of the reference position Pref is equal to the normal mirror 120 (ΔRv1) (in other words, the inclination of the straight line is equal to the normal mirror). Further, the extraction range setting part 90 is configured such that, in the case where the reference position Pref of the operator 100 exceeds the position threshold value THpref (or the area 200), the change of the movement amount ΔRsb (ΔRsb22) of the extraction range Rsb relative to the change amount ΔPref of the reference position Pref is larger than the normal mirror 120 (ΔRv1) (in other words, the inclination of the straight line is steeper than the normal mirror).

An area 200 of FIG. 8 is the same as the area 200 of FIG. 5 and corresponds to the normal mirror 120 (the first comparative example). An area 202 of FIG. 8 is the same as the area 202 of FIG. 5 and indicates the expanded area by the electronic room mirror 28 of the second comparative example. An area 206 of FIG. 8 indicates an area expanded by using the electronic room mirror 28 of the first modified embodiment. In other words, the areas 200, 206 correspond to the first modified embodiment. An arrow 226 indicates a state in which the area 206 is reduced from the area 202. An arrow 228 indicates a state in which the area 206 is expanded from the area 200.

According to the first modified embodiment, when the reference position Pref of the operator 100 does not exceed the position threshold value THpref, it is possible to realize the feeling of use which is equal to the normal mirror 120. Further, when the reference position Pref of the operator 100 exceeds the position threshold value THpref, since it is possible to see the whole of the circumferential image Isr in a small change amount $\Delta$Pref, the convenience of the operator 100 in relation to the use of the circumferential image Isr of the vehicle 10 can be improved.

FIG. 9 is a diagram showing a relationship between the change amount $\Delta$Pref of the reference position Pref of the operator 100 and the movement amount $\Delta$Rsb of the extraction range Rsb in accordance with a second modified embodiment. In FIG. 9, the movement amount $\Delta$Rsb of the second modified embodiment is designated as $\Delta$Rsb31, $\Delta$Rsb32. The extraction range setting part 90 (the image control section) (FIG. 1) of the second modified embodiment is configured such that the movement amount $\Delta$Rsb of the extraction range Rsb relative to the change amount $\Delta$Pref of the reference position Pref is changed in accordance with a distance D between the display part 50 and the reference position Pref of the operator 100.

In FIG. 9, the movement amount $\Delta$Rsb31 is a characteristic in the case of D1 in which the distance D exceeds a distance threshold value THd, and is equal to the mirror 120 ($\Delta$Rv1). The movement amount $\Delta$Rsb32 is the movement amount $\Delta$Rsb of the second modified embodiment in the case of D2 in which the distance D is less than the distance threshold value THd and smaller than D1, and indicates a steeper inclination than that of the normal mirror 120.

The area 200 of FIG. 9 is the same as the area 200 of FIG. 5 and corresponds to the normal mirror 120 (the first comparative example). The area 202 of FIG. 9 is the same as the area 202 of FIG. 5 and indicates the expanded area by the electronic mirror 28 of the second comparative example. An area 210 of FIG. 9 indicates an area when the distance D of the second modified embodiment is D2. In other words, it corresponds to the second modified embodiment when the areas 200, 210 are the distance D2. An arrow 232 indicates a state in which the area 210 is expanded from the area 200.

According to the second modified embodiment, the movement amount $\Delta$Rsb of the extraction range Rsb relative to the change amount $\Delta$Pref of the reference position Pref can be increased or decreased when the operator 100 has changed the reference position Pref in order to see the imaged image Icp in the vicinity of the boundary of the imaged range Rcp of the rear camera 20 (and the side cameras 22a, 22b). Therefore, the convenience of the operator 100 in relation to the use of the circumferential image Isr of the vehicle 10 can be further improved.

Further, in the second modified embodiment, when the distance D is less than the distance threshold value THd, a change amount (change rate) of the movement amount $\Delta$Rsb relative to the change amount $\Delta$Pref of the reference position Pref is changed. In the case of the normal mirror 120 (the first comparative example), as the distance d is charter, the movement amount $\Delta$Rv of the visual field range Rv relative to the change amount $\Delta$Pref of the reference position Pref becomes larger. Further, the extraction range Rsb of the electronic mirror 28 is wider than the visual field range Rv of the normal mirror 120. Therefore, when the movement amount $\Delta$Rv of the visual field range Rv becomes larger, the change amount (change rate) of the movement amount $\Delta$Rsb relative to the change amount $\Delta$Pref of the reference position Pref is made larger than that of the normal mirror 120, so that the whole of the extraction range Rsb can be effectively used.

Further, when the distance D is not less than the distance threshold value THd, the change amount (change rate) of the movement amount $\Delta$Rsb relative to the change amount $\Delta$Pref of the reference position Pref can also be changed. In the case of the normal mirror 120 (the first comparative example), as the distance D is longer, the change amount $\Delta$Pref of the reference position Pref relative to the movement amount $\Delta$Rv of the visual field range Rv becomes smaller. In other words, unless the change amount $\Delta$Pref of the reference position Pref is made larger as the distance D is longer, the desired movement amount $\Delta$Rv of the visual field range Rv cannot be realized. However, in the case where the change amount (change rate) of the movement amount $\Delta$Rsb relative to the change amount $\Delta$Pref of the reference position Pref is changed when the distance D is not less than the distance threshold value THd, it is easy to cope with such situation.

Further, with respect to the second modified embodiment (FIG. 9), the movement amount $\Delta$Rsb32 is allowed to correspond to the distance D1 by letting the movement amount $\Delta$Rsb31 correspond to the distance D2. In addition, although, in the second modified embodiment (FIG. 9), the movement amounts Rsb31, $\Delta$Rsb32 are switched in response to the comparison with the distance threshold value THd, it is possible to change gradually (or proportionally) the change amount of the movement amount $\Delta$Rsb relative to the change amount $\Delta$Pref of the reference position Pref in accordance with the distance D.

In the above described embodiment, the first modified embodiment and the second modified embodiment, the explanation is made with respect to the extraction range Rsb in the left and right direction (FIGS. 6 to 9, etc.). However, from a viewpoint of increasing or decreasing the movement amount $\Delta$Rsb of the extraction range Rsb of the imaged image Icp relative to the change amount $\Delta$Pref of the reference position Pref in comparison with the case of the normal mirror 120 (the first comparative example of FIGS. 3 and 5), it is not limited to that. The present invention is applicable to the setting of the extraction range Rsb in the forward and backward direction and in the upward and downward direction, for example.

DESCRIPTION OF REFERENCE CHARACTERS

10: Vehicle, 12: Image display device, 20: Rear camera (camera), 22a: Left side camera (camera), 22b: Right side camera (camera), 50: Display part, 80: Reference position detection part, 82: Image control section, 100: Operator, 104: Eye, 120: Normal mirror, 122: Mirror surface, Icp: Imaged image, Isr: Circumferential image, Pref: Reference position, Rsb: Extraction range, THpref: Position threshold value, $\Delta$Pref: Change amount of reference position, $\Delta$Rsb: Movement amount of extraction range.

The invention claimed is:

1. An image display device, comprising:
a camera configured to capture an image of a rear view from a vehicle;
a display part configured to display an image extracted from the captured image;
a reference position detection section configured to detect a reference position which is a relative position of eyes of an operator relative to the display part; and
an image control section configured to,
  determine an extraction range in the captured image in accordance with the reference position and extract a part of the captured image of the extraction range to display the part of the image as a circumferential image on the display part, and
  detect a change amount of the reference position and determine a movement amount of the extraction range in accordance with the change amount of the reference position, thereby changing the circumferential image displayed on the display part so as to display a virtual mirror image thereon;
wherein the image control section is configured to increase or decrease the movement amount of the extraction range relative to the change amount of the reference position on the virtual mirror image, in comparison with an actual movement amount of a visual field range relative to the change amount of the reference position on an actual mirror in the case of replacing the display part with the actual mirror, and
wherein the image control section is configured such that, when the reference position does not exceed a position threshold value, the movement amount of the extraction range relative to the change amount of the reference position is set to be equal to the actual movement amount of the visual field range relative to the change amount of the reference position on the actual mirror, and that, when the reference position exceeds the position threshold value, the movement amount of the extraction range relative to the change amount of the reference position is set to be larger than the actual movement amount of the visual field range relative to the change amount of the reference position on the actual mirror.

2. The image display device according to claim 1, wherein the image control section is further configured to detect a distance between the display part and the reference position and to change the movement amount of the extraction range relative to the change amount of the reference position in accordance with the distance between the display part and the reference position.

* * * * *